United States Patent
Andrianov

(10) Patent No.: US 7,643,964 B2
(45) Date of Patent: Jan. 5, 2010

(54) METHOD, SYSTEM AND APPARATUS FOR MEASURING AN IDLE VALUE OF A CENTRAL PROCESSING UNIT

(75) Inventor: Vitaly Andrianov, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/892,205

(22) Filed: Aug. 21, 2007

(65) Prior Publication Data
US 2009/0055113 A1 Feb. 26, 2009

(51) Int. Cl.
*G04F 10/00* (2006.01)
(52) U.S. Cl. .................... 702/176; 713/323
(58) Field of Classification Search ......... 702/176–178, 702/182, 186; 713/300, 320, 322–324, 600–601
See application file for complete search history.

(56) References Cited

U.S. PATENT DOCUMENTS

| | | | |
|---|---|---|---|
| 5,689,691 A * | 11/1997 | Mann | 713/502 |
| 6,193,422 B1 * | 2/2001 | Belt et al. | 713/320 |
| 7,043,649 B2 * | 5/2006 | Terrell, II | 713/322 |
| 2003/0217296 A1 * | 11/2003 | Ma | 713/300 |
| 2004/0098631 A1 | 5/2004 | Terrell | |
| 2004/0249601 A1 * | 12/2004 | Circenis | 702/178 |
| 2005/0155021 A1 | 7/2005 | DeWitt, Jr. et al. | 717/130 |
| 2006/0031691 A1 * | 2/2006 | Bacchus et al. | 713/300 |
| 2006/0212269 A1 | 9/2006 | Lee et al. | |

* cited by examiner

*Primary Examiner*—Eliseo Ramos Feliciano
*Assistant Examiner*—Mary C Baran
(74) *Attorney, Agent, or Firm*—Steven A. Shaw; W. James Brady; Frederick J. Telecky, Jr.

(57) ABSTRACT

In a method, system and apparatus for measuring an idle value of a Central Processing Unit (CPU) in an embedded system, the CPU increments a hardware counter in accordance with clock signals. The CPU also increments an idle counter during a predetermined period of time in accordance with the clock signals while an idle task is running. The CPU calculates the idle value as a ratio of total increments of the idle counter to total increments of the hardware counter after the predetermined period of time has expired.

14 Claims, 2 Drawing Sheets

METHOD, SYSTEM AND APPARATUS FOR MEASURING AN IDLE VALUE OF A CENTRAL PROCESSING UNIT

TECHNICAL FIELD

The technical field relates generally to a method or apparatus for evaluating system behavior of a central processing unit and, more particularly, to evaluating system behavior of a central processing unit implemented within an embedded system.

BACKGROUND

The system behavior of a Central Processing Unit (CPU) when running different loads and when extended by a possible future system can be evaluated and predicted by measuring an idle value of the CPU. Conventionally, the idle value of the CPU (CPU idle value) of a traditional hard real-time operating system is obtained by running an idle task, also known as idle process, having the lowest priority. The idle task produces a dummy job such as incrementing a counter for a predetermined period of time (idle interval). The value of the counter after running the dummy job is then compared with a predetermined calibration value, which can be equal to a counter value when the idle task was run without any other simultaneous tasks. This approach can obtain a very precise idle value measurement.

A significant number of recently developed embedded systems included a CPU configured to operate a Linux-based operating system. However, Linux is not a hard real-time operating system; therefore, the above conventional approach to obtaining the CPU idle value cannot be used. Further, although Linux includes its own particular mechanism for measuring the CPU idle value, it does not work correctly on embedded systems because of a conflict with the design approach of Linux. Particularly, Linux is a UNIX-like system designed as a multitasking operating system for a desktop personal computer. The Linux kernel runs the idle task while there are no other tasks ready, and the CPU idle value measurement is based on system ticks with either 10 ms or 1 ms granularity. The Linux scheduler dedicates several system ticks for each task, and the CPU idle value measurement is based on the system ticks.

However, on an embedded system, each task may run on a fractional number of a system tick, thereby rendering the native Linux idle calculation based on system ticks inaccurate. For example, as shown in FIG. 3, an embedded system runs two very short tasks A and B. A scheduler controls the task switches, and decides how many fractional system ticks to dedicate for each of the task. However, because the tasks are scheduled in accordance with external hardware events, the tasks do not begin simultaneously with the system ticks (1, 2, 3, 4). The task accounting reads the same jiffy values at start and end of the tasks, and assumes that the tasks consume zero CPU. As a result, the accounting shows that the system is 100% idle, even though as shown in FIG. 3, the system may be up to 90% busy.

Therefore, what is needed is a method, system or apparatus for providing an accurate measurement of the CPU idle value in an embedded system.

SUMMARY

Accordingly, an idle value measurement apparatus provides an accurate measurement of an idle value of a CPU in an embedded system. The idle value measurement apparatus includes a memory coupled to the CPU, the memory including instructions for configuring the CPU; a hardware counter coupled to the CPU for continuously incrementing in accordance with a CPU clock; and an idle counter coupled to the CPU, wherein the instructions configure the CPU to: generate an enable signal to place the idle counter in an enable state in which it is continuously incremented during a predetermined period of time; generate a disable signal to place the idle counter in a disable state in which the incrementing is paused; and calculate the idle value as a ratio of total increments of the idle counter to total increments of the hardware counter during the predetermined period of time.

A method of measuring an idle value of a CPU in an embedded system includes incrementing a hardware counter and an idle counter for a predetermined period of time; pausing the incrementing of the idle counter while an interrupt process is executed by the CPU; and calculating the idle value as a ratio of total increments of the idle counter to total increments of the hardware counter after the predetermined period of time has expired.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

DETAILED DESCRIPTION

Figure 1:
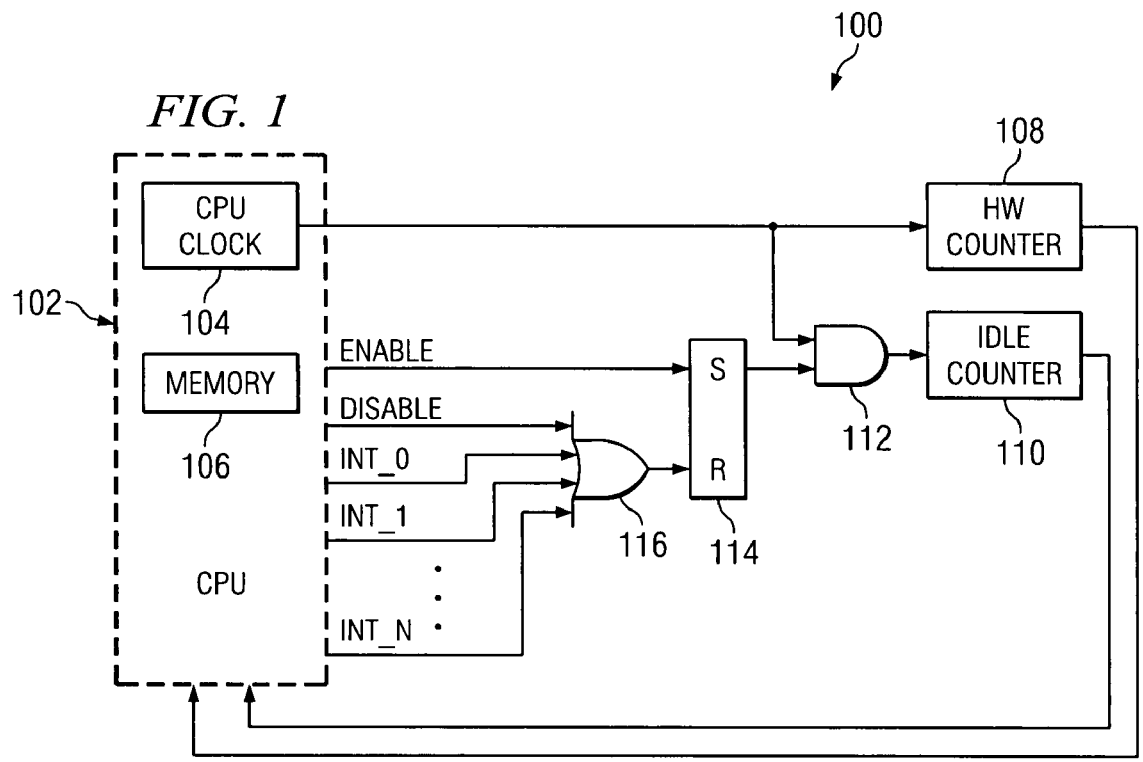
FIG. 1 is a block diagram of an exemplary apparatus for measuring an idle value of a Central Processing Unit of an embedded system.
Figure 3:
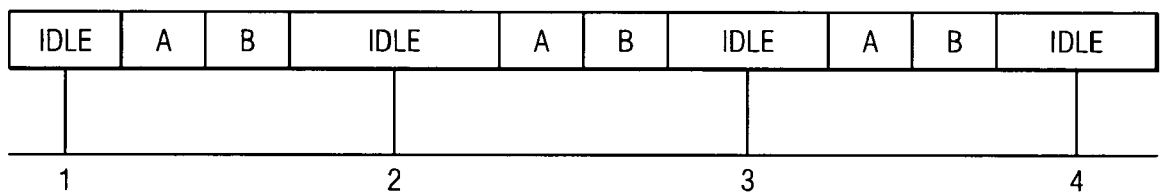
FIG. 3 is an illustration of operation of the idle measurement and other tasks with respect to system ticks.

In overview, the present disclosure concerns an embedded system, a central processing unit (CPU), a memory associated with the CPU, and computer readable instructions stored in the memory for configuring the CPU. More particularly, various inventive concepts and principles are embodied in systems, apparatus, and methods for measuring an idle value of the CPU.

The instant disclosure is provided to further explain in an enabling fashion the best modes of performing one or more embodiments of the present invention. The use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in computer instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

One possible approach for providing an accurate measurement of the idle value of a CPU, which will be referred to herein as the CPU idle value, in an embedded system is to modify the Linux kernel by software to include a free running hardware counter which is counted down or up sourced by a CPU reference clock. The usual kernel idle task is similar to an endless loop:

```
void idle_task(void){
    wait_for_interrupt( );
}.
```

The CPU idle value can be measured based upon calculating a ratio between: (a) a difference between values of the hardware counter at the beginning and the end of a predetermined time period, referred to here as IDLE_INTERVAL; and (b) sum of differences between values of the hardware counter before entering the wait_for_interrupt instruction, and after, accumulated for the IDLE_INTERVAL.

However, the implementation of this approach is quite complicated because execution does not always return to the next after the wait_for_interrupt instruction. In most cases, execution goes to the appropriate interrupt handler, thereby requiring the idle measurement code to be embedded into the beginning of the interrupt handler.

The level of complexity of this approach will depend on the CPU type. For example, if an Advanced RISC machine (ARM) has only one interrupt source, then a Microprocessor with Interlocked Pipeline Stages (MIPS) will have five interrupt sources. It is very difficult to embed the measurement code into some of the interrupt handlers. For example, it is not desirable to modify the TLB miss exception handler because it is very short and must execute at a high speed. Further, skipping the TLB miss exception handler will cause loss of the CPU idle value measurement precision.

Referring to FIG. 1, a block diagram of an exemplary apparatus 100 for measuring an idle value of a CPU of an embedded system in a manner simpler than the approach discussed above will now be discussed.

The apparatus 100 will be referred to here as an idle value measurement apparatus, although the apparatus can be implemented by hardware and software extensions to the CPU 102. The CPU 102 includes a CPU clock 104 and a memory 106. Although one memory 106 is shown, it should be appreciated that the CPU 102 can include numerous other memory sources such as registers, and can be a combination of a variety of types of memory such as random access memory (RAM), read only memory (ROM), flash memory, dynamic RAM (DRAM) or the like.

The idle value measurement apparatus 100 includes a hardware counter 108 having an input coupled to the CPU clock 104 of the CPU 102, and an output coupled to the CPU 102. The hardware counter 108 is continuously incrementing in accordance with system ticks or clock signals of the CPU clock 104. The counter values (or outputs) of the hardware counter 108 can be read by the CPU 102.

The idle value measurement apparatus 100 also includes an idle counter 110 having an input coupled to the CPU clock 104 via a logical AND gate 112, and an output coupled to the CPU 102. The inputs of the logical AND gate 112 are connected to the CPU clock 104 and a trigger 114. The idle counter 110 enters an enable state in which it is continuously incremented in accordance with system ticks of the CPU clock 104 when an enable signal is received from the trigger 114. The idle counter 110 enters a disable state in which it is not incremented or paused when a disable signal is received from the trigger 114.

The trigger 114 is coupled to the CPU 102 and a logical OR gate 116. The trigger 114 can be, for example, an SR latch, which can be reset by the logical OR gate 116. Particularly, the logical OR gate 116 is coupled to the CPU 102 to receive a disable signal and interrupt signals. The trigger 114 can be set when an enable signal is received from the CPU 102 and when the logical OR gate 116 receives no disable signal or interrupt signals. When the trigger 114 is set, it places the idle counter 110 in the enable state. The trigger 114 can be reset when the logical OR gate 116 receives a disable signal or one or more interrupt signals from the CPU 102. The interrupt signals can be sent by the CPU 102 as a result of a hardware interrupt. When the trigger 114 is reset, it places the idle counter 110 in the disable state.

The memory 106 can include an operating system, variables, executable code, and other data. The operating system can be, for example, a Linux-based operating system. The operating system will include a scheduler for scheduling processor time for each task to facilitate multitasking. Further, the memory 106 can include instructions such as computer programs for configuring the CPU 102. The computer programs can include, for example, disabling/enabling instructions and idle value calculation instructions, which can also be included in the scheduler.

The disabling/enabling instructions are for configuring the CPU 102 to generate an enable signal to place the idle counter 110 in the enable state in which it is continuously incremented in accordance with the system ticks from the CPU clock 104 during a predetermined period of time, and to generate a disable signal to place the idle counter 110 in a disable state in which the incrementing is stopped or paused. The enable signal can be generated at the beginning of the predetermined period of time, and the disable signal can be generated when an interrupt process is executed by the CPU 102 or hardware associated with the CPU 102, or when a higher priority task requires execution.

The idle value calculation instructions are for configuring the CPU 102 to calculate the idle value as a ratio of total increments of the idle counter 110 to total increments of the hardware counter 108 during the predetermined period of time.

Figure 2:
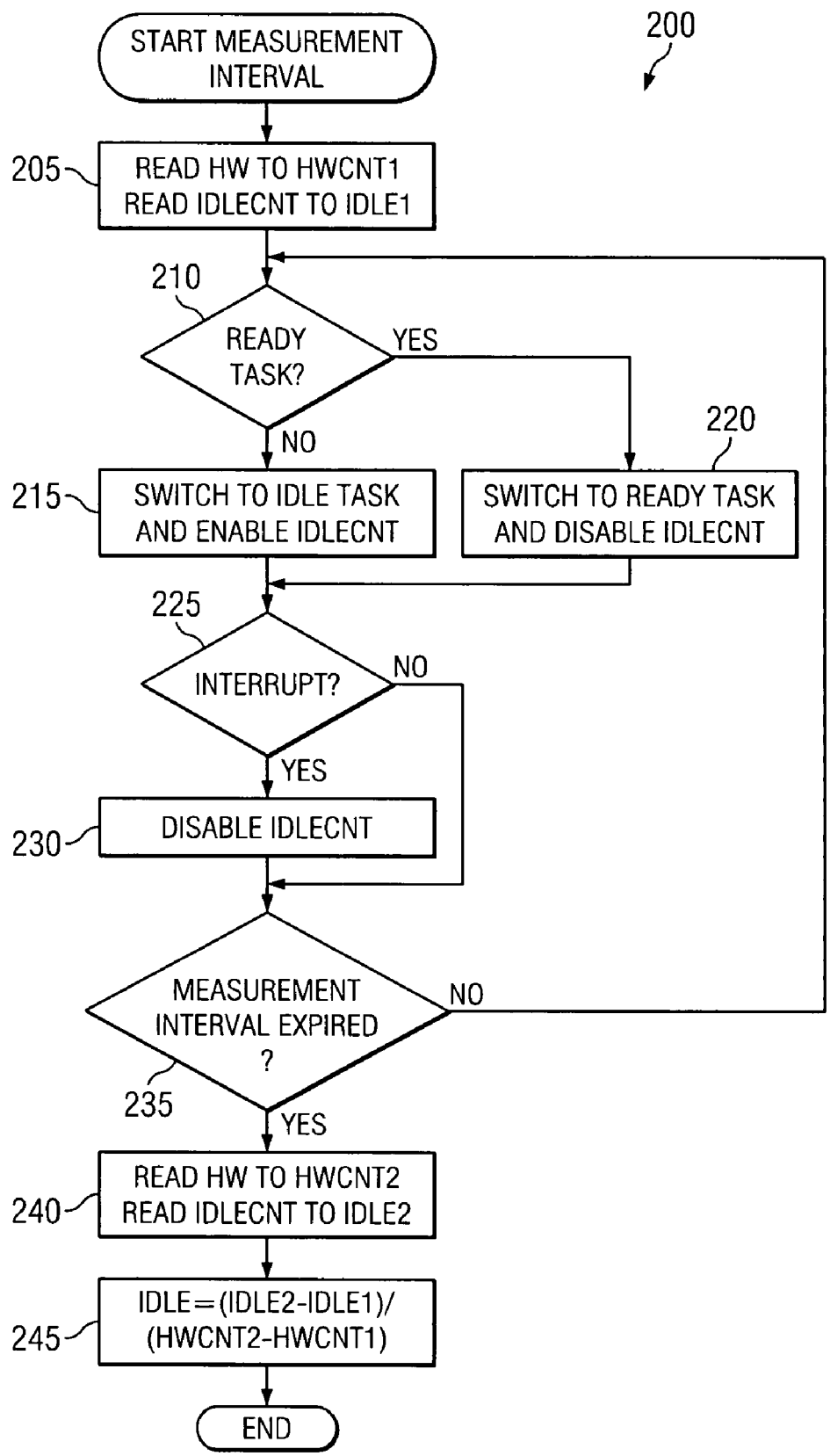
FIG. 2 is a flow diagram illustrating an exemplary procedure for measuring the idle value.

Referring to FIG. 2 an exemplary procedure 200 for measuring the idle value of a CPU will be discussed. The procedure 200 begins upon initiation of a predetermined period of time which will be referred to as a measurement interval. Upon initiation, at 205 the CPU reads the values of the hardware counter (HW) and the idle counter (IDLECNT) and stores the values as HWCNT1 and IDLE1, respectively.

At 210, the scheduler (of the CPU) determines if there is a ready task. For example, a particular task might become ready when an event such as an awaited packet is received from a network. If no task is ready (NO at 210), then at 215 the scheduler switches to executing the IDLE task and generates an enable signal to place IDLECNT in an enable state. However, if a task is ready (YES at 210), then at 220 the scheduler switches to executing the ready task and generates a disable signal to place IDLECNT in a disable state. When IDLECNT is in the enable state, it is continuously incremented along with the HW in accordance with the system ticks from the CPU clock. The idle task can be similar to the void idle_task (void) routine discussed above.

At 225, the scheduler determines if an interrupt process is present to be executed by the CPU. If an interrupt routine is present (YES at 225), then at 230 the scheduler generates a disable signal to disable IDLECNT if the IDLECNT was previously enabled. As a result, the incrementing of the idle counter is paused while the interrupt process is executed by the CPU. If no interrupt process is present (NO at 225), then the process proceeds to 235.

At 235, the scheduler determines if the measurement interval has expired. If the measurement interval has expired (YES at 235), then at 240 the CPU reads the values of the hardware counter (HW) and the idle counter (IDLECNT) and stores the values as HWCNT2 and IDLE2, respectively. At 245, the CPU calculates the idle value (IDLE) by the formula: (IDLE2−IDLE1)/(HWCNT2−HWCNT1). That is, the idle value is calculated as a ratio of total increments of the idle counter to total increments of the hardware counter after the predetermined measurement interval has expired.

If at 235 the scheduler determines that the measurement interval has not expired (NO at 235), then the procedure returns to 210. If the CPU determines that there is no ready task (NO at 210), then at 215 the scheduler generates an enable signal to renew IDLECNT.

The idle value measurement apparatus 100 significantly simplifies the CPU idle value measurement in comparison to the approach discussed earlier. Particularly, an accurate CPU idle value can be obtained by reading the values of the hardware counter 108 and the idle counter 110 at the beginning and end of the IDLE_INTERVAL when the idle task is executed. Before scheduling the idle task, the idle counter 110 has to receive the enable signal, which is only generated when the idle task can be continued. The CPU can place the idle counter in the disable state when the CPU is executing an interrupt process (receives a hardware interrupt). As a result, the idle measurement code does not have to be embedded in the beginning of the interrupt handler.

The idle value measurement apparatus 100 can be implemented within an embedded system including a CPU configured according to instructions stored in a memory to send clock signals or system ticks to a hardware counter to cause the hardware counter to continuously increment, and to also send the clock signals and an enable signal to the idle counter to cause the idle counter to continuously increment during a predetermined period of time. The CPU is further configured to: calculate a CPU idle value as a ratio of total increments of the idle counter to total increments of the hardware counter after the predetermined period of time has expired.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An idle value measurement apparatus for measuring an idle value of a Central Processing Unit (CPU) in an embedded system, the apparatus comprising:
   a memory coupled to the CPU, the memory including instructions for configuring the CPU;
   a hardware counter coupled to the CPU for continuously incrementing in accordance with a CPU clock;
   an idle counter coupled to the CPU; and
   a trigger coupled to the CPU and having an output coupled to the idle counter, wherein the instructions configure the CPU to:
      generate an enable signal to place the idle counter in an enable state in which it is continuously incremented during a predetermined period of time;
      generate a disable signal to place the idle counter in a disable state in which the incrementing is paused; and
      calculate the idle value as a ratio of total increments of the idle counter to total increments of the hardware counter during the predetermined period of time and the trigger is configured to:
         receive the enable signal from the CPU and place the idle counter in the enable state and receive the disable signal from the CPU and place the idle counter in the disable state.

2. The idle value measurement apparatus of claim 1, further comprising:
   a logical AND gate having an output coupled to the idle counter; and
   an input coupled to the CPU clock and the trigger.

3. The idle value measurement apparatus of claim 1, wherein the instructions further configure the CPU to generate the disable signal when an interrupt process is executed by the CPU.

4. The idle value measurement apparatus of claim 1, wherein the instructions further configure the CPU to generate the disable signal when a task is determined to be ready.

5. The idle value measurement apparatus of claim 1, wherein the trigger comprises an SR latch.

6. An embedded system comprising:
   a central processing unit (CPU);
   a memory coupled to the CPU, the memory for storing instructions for configuring the CPU;
   a hardware counter coupled to the CPU;
   an idle counter coupled to the CPU; and
   a trigger coupled to the CPU, and having an output coupled to the idle counter, wherein the CPU is configured to:
      send clock signals to the hardware counter to cause the hardware counter to continuously increment;
      send the clock signals and an enable signal to the idle counter to cause the idle to be in an enable state in which the idle counter continuously increments during a predetermined period of time;
      send a disable signal to the idle counter to cause the idle counter to be in a disable state in which the continuous incrementing is paused; and
      calculate a CPU idle value as a ratio of total increments of the idle counter to total increments of the hardware counter after the predetermined period of time has expired, the trigger is configured to:
         place the idle counter in the enable state so as to begin or renew continuous incrementing- when the trigger receives the enable signal from the CPU, and place the idle counter in the disable state when the trigger receives the disable signal from the CPU.

7. The embedded system of claim 6, wherein the CPU is further configured to send the disable signal to the idle counter when the CPU begins execution of an interrupt routine.

8. The embedded system of claim 6, wherein the CPU is configured to execute a Linux-based operating system.

9. The embedded system of claim 6, further comprising:
a logical AND gate having a first input coupled to the output of the trigger;
a second input coupled to the CPU; and
an output coupled to the idle counter.

10. The embedded system of claim 9, further comprising:
a logical OR gate for outputting the disable signal to the trigger when the logical OR gate receives a signal indicative of execution of an interrupt process by the CPU.

11. The embedded system of claim 10, wherein the trigger is an SR latch that is reset when the logical OR gate receives the signal indicative of execution of an interrupt process by the CPU.

12. The embedded system of claim 6, wherein the memory further includes idle task code instructions for configuring the CPU to execute an idle task routine, the idle task code instructions being

```
void idle_task(void){
    wait_for_interrupt( );
}.
```

13. The embedded system of claim 12, wherein the CPU is further configured to send the enable signal to the idle counter to cause the idle counter to continuously increment during the predetermined period of time when executing the idle task routine and to send the disable signal to the idle counter when the CPU is executing an interrupt process.

14. The embedded system of claim 6, wherein the trigger comprises an SR latch.

* * * * *